Figure 1:
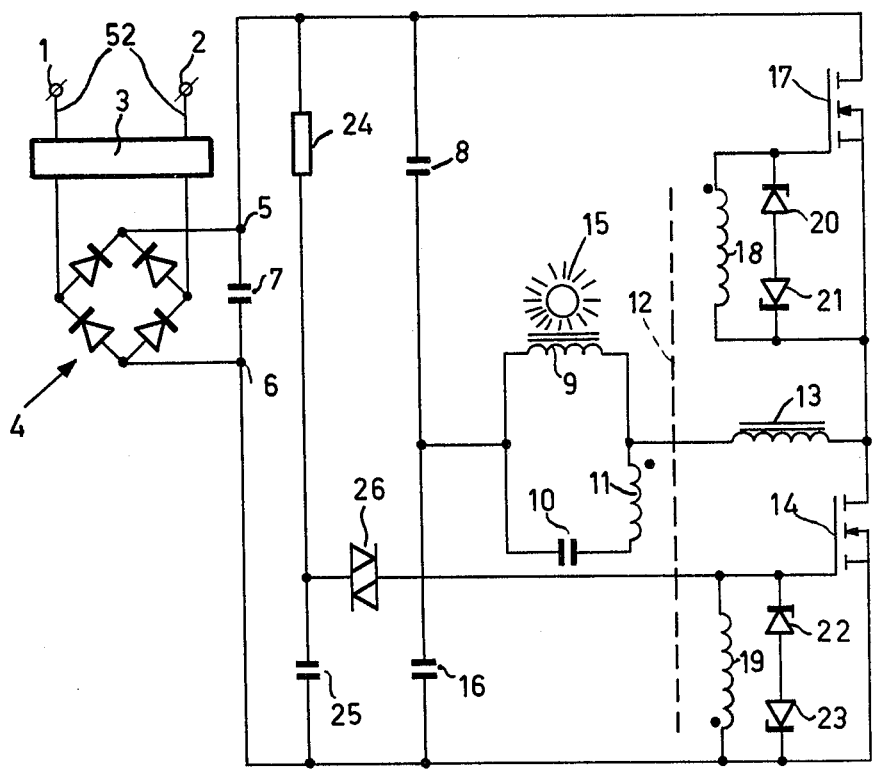

United States Patent [19]

Houkes

[11] 4,415,838

[45] Nov. 15, 1983

[54] FREQUENCY CONVERTER FOR SUPPLYING AN ELECTRODELESS DISCHARGE LAMP

[75] Inventor: Henk Houkes, Eindhoven, Netherlands

[73] Assignee: U.S. Philips Corporation, New York, N.Y.

[21] Appl. No.: 283,398

[22] Filed: Jul. 15, 1981

[30] Foreign Application Priority Data

Jul. 21, 1980 [NL] Netherlands .......................... 8004175

[51] Int. Cl.³ ............................................ H05B 41/24
[52] U.S. Cl. .................................... 315/248; 315/276; 315/283; 315/287
[58] Field of Search ............... 315/248, 267, 276, 283, 315/287, 244; 363/159, 163, 171, 173, 37; 331/117 FE

[56] References Cited

U.S. PATENT DOCUMENTS 4,245,178  1/1981  Justice ............................. 315/267 X
4,334,324  6/1982  Hoover ........................... 363/163 X

FOREIGN PATENT DOCUMENTS 55-161361 12/1980 Japan .................................. 315/248

Primary Examiner—Eugene R. LaRoche
Assistant Examiner—Vincent De Luca
Attorney, Agent, or Firm—Robert T. Mayer; Bernard Franzblau

[57] ABSTRACT

A frequency converter for supplying an electrodeless discharge lamp comprises a VMOS controlled semiconductor switching element and a parallel circuit including an electric coil coupled to a discharge path of the lamp. A control circuit of the switching element includes a transformer which, in combination with two Zener diodes, results in a low-loss control circuit for the VMOS and, hence, an increased system efficiency.

7 Claims, 2 Drawing Figures

FREQUENCY CONVERTER FOR SUPPLYING AN ELECTRODELESS DISCHARGE LAMP

The invention relates to a frequency converter for energizing an electrodeless discharge lamp at a frequency of at least 0.5 MHz, the converter having two input terminals for connnection to a direct voltage source. The two input terminals are interconnected by a first series arrangement of a semiconductor switching element having a control electrode, a first coil, and a parallel arrangement of at least a first branch comprising a second coil and a branch comprising at least a capacitor, the second coil being coupled to the discharge path of the lamp in the operating condition of the lamp.

The invention further relates to an arrangement including such a frequency converter. In addition, the invention relates to a lamp unit including said arrangement and an electrodeless discharge lamp to be supplied via the frequency converter of that device.

Supplying an electrodeless discharge lamp at a frequency of at least 0.5MHz has the advantage that the efficiency of the coupling of the second coil to the discharge path is generally high.

A known frequency converter of the type described in the opening paragraph is disclosed in, for example, U.S. Pat. No. 3,500,118. The semiconductor switching element in that known frequency converter is a transistor.

A disadvantage of that prior art frequency converter is that its efficiency is relatively low. This is inter alia due to the fact that the semiconductor switching element is controlled by means of a control circuit comprising a resistor.

It is an object of the invention to provide a frequency converter of the type described in the opening paragraph whose efficiency is high.

The invention accordingly provides a frequency converter for supplying an electrodeless discharge lamp at a frequency of at least 0.5 Mhz, the converter having two input terminals intended to be connected to a direct voltage source. The two imput terminals are interconnected by a first series arrangement of a semiconductor switching element having a control electrode, a first coil, and a parallel arrangement of at least a first branch comprising a second coil and a branch comprising at least a capacitor, the second coil being coupled to the discharge path of the lamp in the operating condition of the lamp. The invention is characterized in that the control electrode and a main electrode of the controlled semiconductor switching element are interconnected by a secondary winding of a transformer. A primary winding of the transformer forms part of the parallel arrangement and a breakdown element is connected in parallel with a winding of the transformer. The transformation ratio of the transformer is sufficiently large that in the operation condition the voltage across the breakdown element reaches the breakdown value. The semiconductor switching element is a Power MOS-FET. An advantage of the frequency converter is that its efficiency is relatively high, the reason being that the control of the semiconductor switching element is substantially loss-free. In addition, the control signal may be a square-wave signal because of the presence of the breakdown element. This promotes a reduction of electric losses in the semiconductor switching element itself. Furthermore, the above-described semiconductor switching element results in a still higher efficiency.

The invention is inter alia based on the recognition that a higher efficiency of the converter may be achieved by improving the control of the semiconductor switching element of the frequency converter, and that this results in a higher system efficiency of the combination of the frequency converter and an electrodeless discharge lamp to be supplied therewith. The system efficiency is expressed in, for example, lumens per Watt. The transformer may be of a small size because of the high operating frequency of at least 0.5 MHz.

It should be noted that a frequency converter for supplying an elecrodeless discharge lamp is also described in U.S. Pat. No. 4,245,178. However, the frequency of the lamp supply is there less than 0.5 MHz.

In a frequency converter according to the invention, the controlled semiconductor switching element may be a VMOS. A VMOS must here be understood to mean a Power MOS-FET, wherein one main electrode (source) is situated at one side of the semiconductor switching element crystal and the other main electrode (drain) at the other side of the crystal (Vertial Power MOS-FET). An advantage of the use of a power VMOS is that the efficiency is very high, notably because the losses in the semiconductor switching element are very low. A further advantage is that the operating frequency may be high, for example 2 MHz or more. This increases the coupling efficiency between the second coil and the electrodeless discharge lamp. This results in a further contribution to a higher system efficiency.

It should be noted that a frequency converter comprising a VMOS and having two input terminals which are intended to be connected to a direct voltage source, the VMOS being arranged in series with a parallel arrangement including fluorescent lamp, is known per se from: "VMOS Application Ideas", I.T.T. Edition 1979/8, pages 7 and 8. This publication does not relate, however, to operation of an electrodeless lamp.

A frequency converter according to the invention may, for example, be a converter having only one semiconductor switching element. In a preferred embodiment of a frequency converter according to the invention, the first coil forms part, together with the parallel arrangement, of a centre arm of a bridge circuit, and the bridge circuit further comprises four bridge arms, the first arm comprising a first auxiliary capacitor, the second arm comprising a second auxiliary capacitor, the third arm comprising the VMOS, and the fourth arm comprising a second VMOS. The first series arrangement between the input terminals also comprises the first auxiliary capacitor, the first arm and the second arm having been arranged in series, and also the third arm and the fourth arm having been arranged in series, and the series arrangement of the first arm and the second arm is in parallel with the series arrangement of the third arm and the fourth arm. An advantage of this embodiment is that the voltage between the main electrodes of a semiconductor switching element cannot exceed the magnitude of the direct voltage between the input terminals of the frequency converter. Therefore, the revelant two semiconductor switching elements need not be able to withstand much higher voltages.

The frequency converter may, for example, be connected to a battery by means of its input terminals.

The invention also relates to an arrangement including a frequency converter of the type defined above and a full-wave bridge rectifier having two input terminals and two output terminals, the input terminals being for connection to an alternating voltage source whose frequency is less than 500 Hz, and the two output terminals are connected to respective input terminals of the frequency converter. An advantage of such an arrangement is that it may be connected directly to a conventional low-frequency alternating voltage supply of less than 500 Hz, for example a domestic supply of 50 or 60 Hz; or a marine supply of, for example, 400 Hz.

Figure 2:
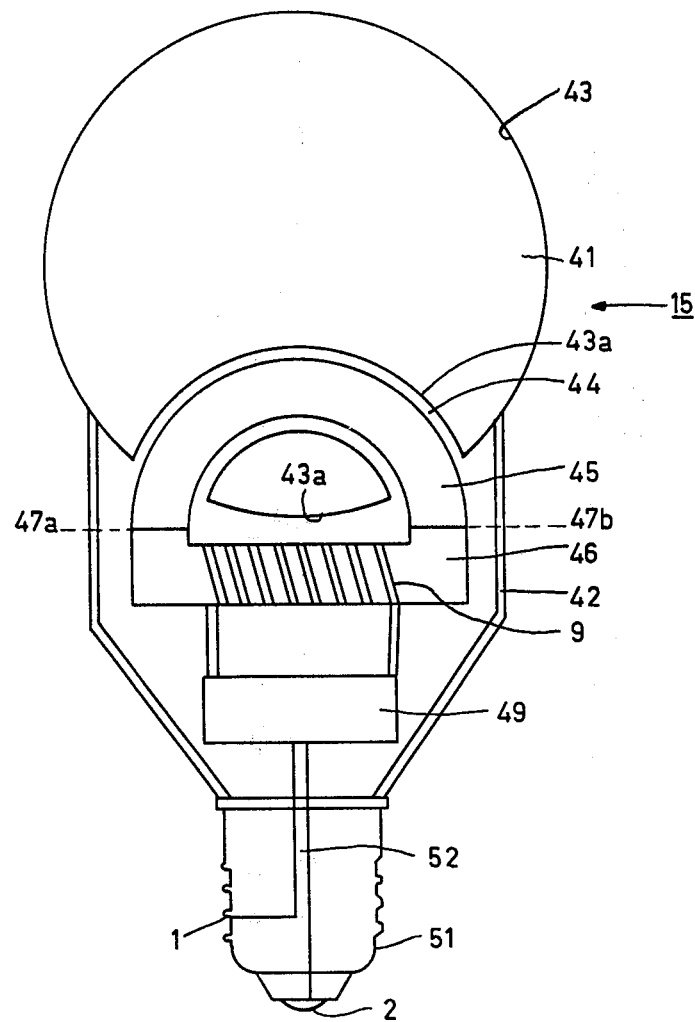

Finally, the invention also relates to a lamp unit including such an arrangement with the lamp unit also comprising an electrodeless discharge lamp, the second coil of the frequency converter of said arrangement being coupled to a discharge path of that electrodeless discharge lamp. An advantage of this lamp unit is that it has a very high system efficiency and that it can be connected in a simple way to a conventional alternating voltage supply. Such a lamp unit is a suitable alternative for, for example, an incandescent lamp. An embodiment according to the invention will now be explained with reference to the accompanying drawing, in which:

FIG. 1 shows an electric circuit of a frequency converter of the invention, as well as a full-wave rectifier, and FIG. 2 is a longitudinal cross-section through a lamp unit comprising an electrodeless low-pressure mercury vapour discharge lamp and an electric circuit as shown in FIG. 1 for supplying that lamp.

In FIG. 1 reference numerals 1 and 2 denote input terminals which are intended to be connected to an alternating voltage source of approximately 220 Volts, 50 Hz. An anti-interference network 3 is connected between the terminals 1 and 2. The terminals 1 and 2 are the input terminals of a full-wave rectifier bridge 4 having four diodes. An output terminal 5 of the rectifier bridge device also forms an input terminal of a frequency converter and a second output terminal 6 of the rectifier bridge forms a second input terminal of the frequency converter.

The two input terminals 5 and 6 of the frequency converter are connected to a main capacitor 7 which represents, in the operating condition of the circuit, a direct voltage source for the frequency converter.

The input terminals 5 and 6 of the frequency converter are interconnected by a first series arrangement of a first capacitor 8, a parallel arrangement of a coil 9 and of a series circuit of a capacitor 10 and a primary winding 11 of a current transformer 12, a coil 13, and a semiconductor switching element 14 which is in the form of a VMOS and has a control electrode.

The coil 13 is referred to hereinafter as the first coil and the coil 9 as the second coil.

The second coil 9 is magnetically coupled to the discharge path of an electrodeless discharge lamp 15 which is schematically shown in FIG. 1. For details of the coil 9 and the lamp 15, reference is made to FIG. 2.

The frequency converter further comprises a second capacitor 16, which is arranged in series with the first capacitor 8 and is furthermore connected to terminal 6.

In addition, a second similar VMOS 17 is connected in series with the first-mentioned VMOS 14 and is further connected to the terminal 5.

In this circuit the combination of the circuit elements 9, 10, 11 and 13 forms a center arm of a bridge circuit whose circuit elements 8, 16, 17 and 14 are comprised in a first arm, a second arm, a third arm and a fourth arm, respectively. The first arm and the second arm are connected in series. The third arm and the fourth arm are also connected in series. Furthermore, the series arrangement of the first arm and the second arm (8, 16) is arranged in parallel with the series arrangement of the third and the fourth arms (17, 14).

The transformer 12 further comprises two secondary windings 18 and 19. Winding 18 forms part of a control circuit of the VMOS 17 and connects a control electrode of the VMOS 17 to a main electrode of that VMOS. The ends of the winding 18 are interconnected by a breakdown element formed by a back-to-back series circuit of two Zener diodes 20 and 21. Winding 19 forms part of a control circuit of the VMOS 14 and connects a control electrode of the VMOS 14 to a main electrode of that controlled semiconductor switching element. The ends of the secondary transformer winding 19 are interconnected by a breakdown element formed by a back-to-back series circuit of Zener diodes 22 and 23.

In addition, the control circuit of the VMOS 14 comprises a starting circuit consisting of, inter alia, a series circuit of a resistor 24 and a capacitor 25, this series circuit interconnecting the input terminals 5 and 6 of the frequency converter. The said starting circuit further comprises a branch which includes a bidirectional breakdown element (diac) 26, which is connected to a junction between the resistor 24 and the capacitor 25 and also to the control electrode of the VMOS 14.

The circuit described operates as follows. When the terminals 1 and 2 are connected to the alternating voltage source, the capacitors 7, 8 and 16 are charged via the rectifier bridge 4. At the same time the capacitor 25 is charged via the resistor 24. When capacitor 25 has been charged to a value such that the breakdown voltage of the circuit element 26 is reached, a current pulse through element 26 renders the VMOS 14 conductive. Then a current flows in the circuit 8, 9; 10, 11, 13, 14. At first the current flows in winding 11 in a direction so as to maintain VMOS 14 conductive via winding 19 of transformer 12. At the same time, winding 18 maintains VMOS 17 in cut-off. This current charges capacitor 10 which then produces an oscillation in the parallel circuit 9, 10, 11, which was initally uncharged. This oscillation in winding 11 of the transformer 12 now renders the VMOS 14 non-conductive via winding 19 of the transformer 12, whereas the VMOS 17 is rendered conductive via winding 18. This produces a current in the circuit 17, 13, 9, 11, 10 and capacitor 16. As described above, this produces a further oscillation in the parallel circuit 9, 10, 11, whereupon the VMOS 17 is rendered non-conductive again and the VMOS 14 is rendered conductive, and so on.

The currents then flowing through the second coil 9 cause a discharge in the lamp discharge path, as a result of which the electrodeless discharge lamp 15 starts emitting light.

The control signals for the VMOS switching elements 14 and 17 are made rectangular by means of the Zener diodes 20 to 23.

In a practical embodiment the circuit elements have approximately the values indicated in the following Table:

TABLE

| capacitor 7 | approximately | 8 μFarad |
|---|---|---|
| capacitor 8 | " | 22 nFarad |

TABLE-continued

| | | |
|---|---|---|
| capacitor 10 | " | 560 pFarad |
| capacitor 16 | " | 22 nFarad |
| capacitor 25 | " | 2,7 nFarad |
| coil 9 | " | 5 µHenry |
| coil 13 | " | 30 µHenry |
| resistor 24 | " | 1 MOhm |
| zener voltage of each zener diode 20 to 23 | " | 5,6 Volts |
| Breakdown voltage of circuit element 26 | " | 40 Volts |
| Transformer primary winding 11 | | 2 turns |
| secondary windings 18 and 19 | | 15 turns |

In the described embodiment the operating frequency is approximately 3 MHz. The effective current through the coil 13 is approximately 0.25 A and the current through the coil 9 is approximately 0.6 A. This converter operates in class D. If the zener diodes 20 through 23 were omitted, the control voltages of the VMOS 14 and 17 would increase to over 10 Volts and would exceed the maximum allowable gate-source voltage of the VMOS devices.

FIG. 2 illustrates a lamp unit having a circuit as described with reference to FIG. 1.

In FIG. 2 reference numeral 15 denotes the electrodeless lamp, which is shown here in longitudinal section. Reference numeral 9 denotes the second coil of the parallel circuit 9, 10, 11; see also FIG. 1.

The electrodeless discharge lamp 15 of the lamp unit shown in FIG. 2 comprises a glass lamp vessel 41. Reference numeral 42 denotes a base of that lamp unit. The interior surface of the lamp vessel is coated with a luminsecent layer 43, which converts the ultraviolet radiation generated in the lamp vessel into visible light. The lamp vessel comprises an arcuate tubular channel 44 in which a semi-circular ferrite core 45 is positioned by means of a clamp connection (not shown). This ferrite core forms part of a closed ring core which is completed by separate ferrite yoke 46. The yole 46 is housed in the lamp base 42. The line of separation of the two ferrite portions is in the plane 47a-47b. The coil 9 is wound around the yoke 46 (see also FIG. 1). Coil 9 also may be wound partly or totally around ferrite core 45. The coil is fed from a high-frequency supply unit, as described with reference to FIG. 1. The block 49 in FIG. 2 represents the assembly of the circuit elements 3 through 8, 10 through 14, and 16 through 26 of FIG. 1.

Reference numerals 1 and 2 denote the terminals which, as described with reference to FIG. 1, are intended to be connected to an ac supply of approximately 220 Volts, 50 Hz. The terminals 1 and 2 are part of a threaded cap 51 of the lamp base 42. Reference numeral 52 denotes connecting wires from the terminals 1 and 2 to the block 49.

In a practical embodiment of the above-described lamp unit, the diameter of the globular glass lamp vessel is approximaately 80 mm. The lamp vessel contains a quantity of mercury (approximately 20 mg) and argon at a pressure of approximately 190 Pascal. A luminescent layer consisting of a mixture of three phosphors, namely blue-luminescing bivalent europium-activated barium magnesium aluminate, green luminscing terbium-activated cerium magnesium aluminate, and red-luminescing trivalent europium-activated yttrium oxide, is disposed on the interior of the lamp vessel wall. The exterior wall surface of the tubular channel is provided with a reflecting layer (titanium oxide) 43a. This layer is electrically non-conductive, to prevent the coupling of the coil 9 to a discharge path, inside the lamp vessel 41, from being disturbed. This layer is also provided on the lamp vessel wall which faces the lamp base. The magnetic material of the core consists of a ferrite having a relative permeability of approximately 100. The coil 9 consists of a copper foil strip having a width of approximately 2 mm and approximately 0.1 mm thick. The number of turns is eight. For the embodiment of the circuit described with reference to FIG. 1 the high-frequency oscillator has, as mentioned above, a frequency of approximately 3 MHz. This is greater than the minimum frequency of 0.5 MHz required for efficient operation of the lamp.

For an applied power to the lamp unit of approximately 17 Watts the luminous flux was 850 lm. The efficiency of the frequency converter is well over 80%. The system efficiency (lamp + power supply) is approximately 50 lm/W.

The high efficiency of the described frequency converter is achieved because the losses in the control circuit of the semiconductor switching elements and the losses in the semiconductor switching elements themselves are small.

The described lamp unit is a suitable alternative for an incandescent lamp.

What is claimed is:

1. A frequency converter for energizing an electrodeless discharge lamp at a frequency of at least 0.5 MHz comprising, two input terminals adapted to be connected to a direct voltage source, means connecting the two input terminals to a first series arrangement of a power MOS-FET semiconductor switching element having a control electrode, a first coil, and a parallel arrangement of at least a first branch comprising a second coil and a branch comprising at least a capacitor, the second coil being coupled to the discharge path of the lamp in the operating condition of the lamp, a trans former having a primary and a secondary winding, means connecting said secondary winding to the control electrode and to a main electrode of the controlled semiconductor switching element, means connecting the primary winding of the transformer so that it forms part of the parallel arrangement, and means connecting a breakdown element in parallel with a winding of the transformer, the transformation ratio of the transformer being sufficiently large so that in the operating condition the voltage across the breakdown element reaches the breakdown value.

2. A frequency converter as claimed in claim 1 wherein the controlled semiconductor switching element comprises a VMOS.

3. A frequency converter as claimed in claim 2 wherein the first coil and the parallel arrangement together form part of a center arm of a bridge circuit that further comprises four arms, the first arm comprising a first auxiliary capacitor, the second arm comprising a second auxiliary capacitor, the third arm comprising the VMOS element, and the fourth arm comprising a second VMOS element, and wherein the first series arrangement between the input terminals also comprises the first auxiliary capacitor, and means connecting the first and the second arms and the third and the fourth arms in series and with the series arrangement of the first and the second arms connected in parallel with the series arrangement of the third and the fourth arms.

4. An arrangement including a frequency converter as claimed in claims 1, 2, or 3, and a full-wave bridge rectifier having two input terminals and two output terminals, the input terminals being for connection to an alternating voltage source having a frequency less than 500 Hz, and means connecting the two output terminals to the respective input terminals of the frequency converter.

5. A lamp unit including an arrangement as claimed in claim 4 and an electrodeless discharge lamp, the second coil of the frequency converter of the arrangement being coupled to a discharge path of the electrodeless discharge lamp.

6. A frequency converter for operation of an electrodeless discharge lamp comprising, two input terminals for connection to a source of DC voltage, an FET transistor having a control electrode, means coupling said two input terminals to a series circuit including said FET transistor, a first inductor, and a parallel circuit comprising a second inductor and a capacitor, said second inductor being adapted to be coupled to a discharge path of said lamp, a substantially resistance-free control circuit for said transistor comprising a transformer having a primary winding connected to form a part of said parallel circuit and a secondary winding coupled to the control electrode and to a main current path electrode of the FET transistor so as to switch the transistor on and off at a very high frequency, and a voltage breakdown element coupled across one of said transformer windings and operative to limit the control voltage applied to the control electrode of the FET during operation of the frequency converter.

7. A frequency converter as claimed in claim 6 wherrein said voltage breakdown element comprises a pair of back-to-back series connected Zener diodes coupled across the transformer secondary winding, and wherein the components of the frequency converter are selected so that the operating frequency of the converter is at least 0.5 MHz.

* * * * *